Nov. 11, 1941.  R. H. GUINZBURG  2,262,493
METHOD AND MEANS FOR MAKING QUILTED RUBBER SHEETING
Filed July 15, 1938  3 Sheets-Sheet 1
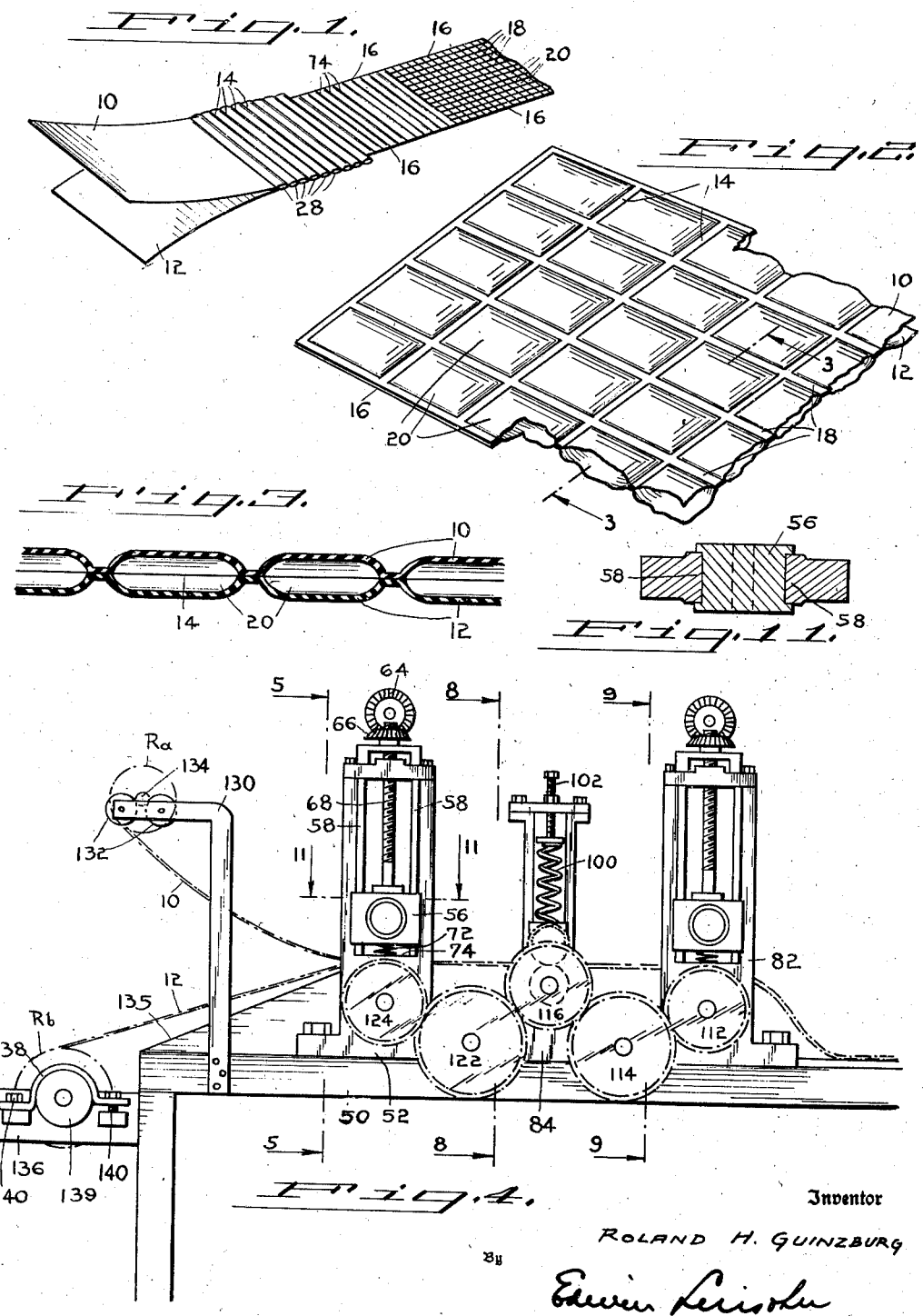
Inventor
ROLAND H. GUINZBURG
By
Edwin Levisohn
Attorney

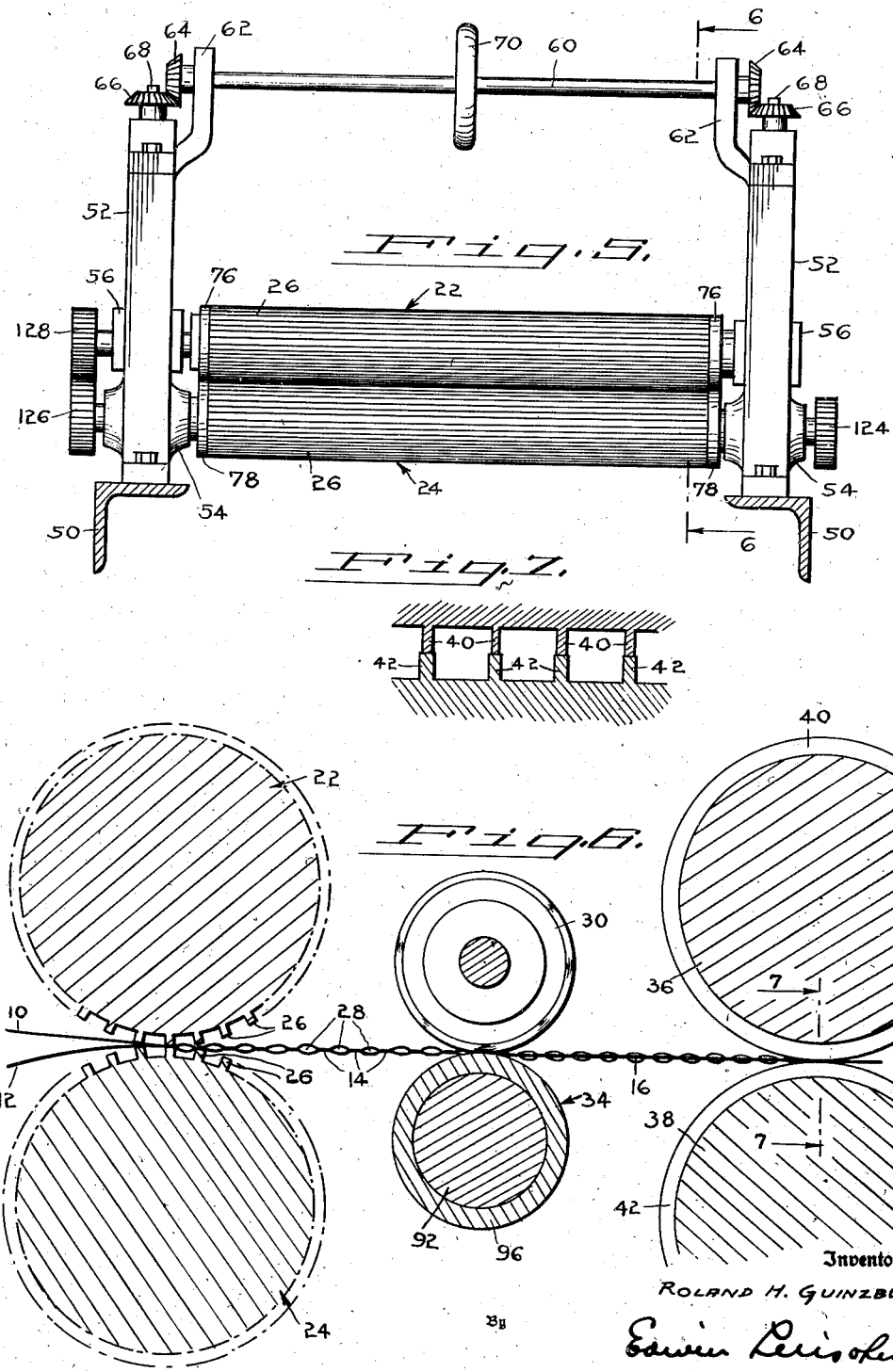

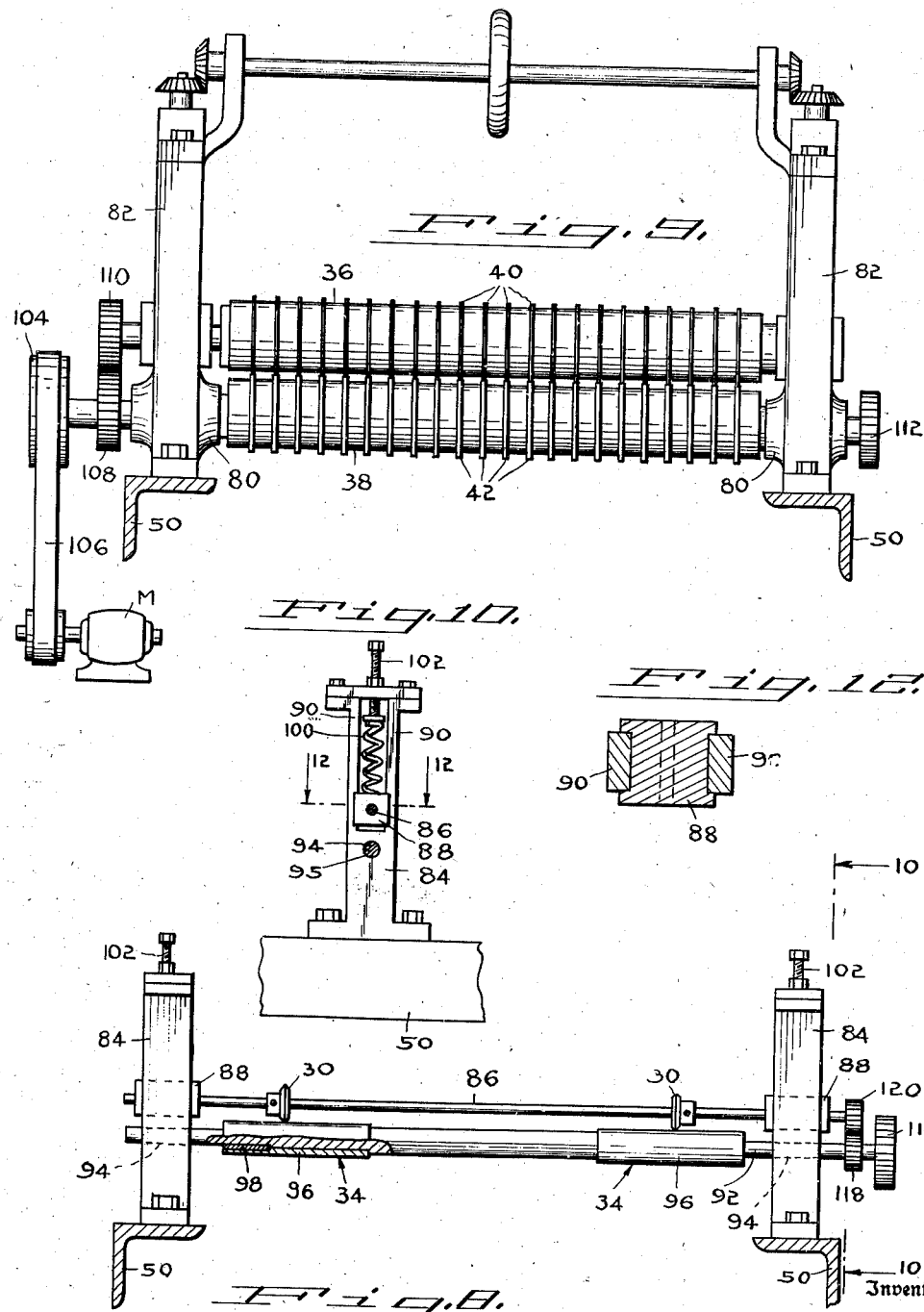

Patented Nov. 11, 1941

2,262,493

UNITED STATES PATENT OFFICE 2,262,493

METHOD OF AND MEANS FOR MAKING QUILTED RUBBER SHEETING

Roland H. Guinzburg, Montrose, N. Y., assignor to I. B. Kleinert Rubber Company, New York, N. Y.

Application July 15, 1938, Serial No. 219,346

15 Claims. (Cl. 18—10)

This invention relates to the manufacture of laminated and pocketed sheeting of vulcanizable material such as sheet rubber and, more particularly, to a method of producing quilted rubber sheeting, and to a machine utilized in accordance with said method.

One object of the invention is to provide a method for producing in a continuous manner laminated sheet rubber united along spaced lines extending transversely of the laminated web or sheet and also along spaced longitudinally extending lines forming air pockets whereby the material thus produced has a quilted or similar appearance and is composed of a multiplicity of air cushions or pockets so that the material has a pad-like resiliency.

Another object of the invention is the provision of a machine operable in a commercially practicable manner to produce the quilted rubber sheeting in accordance with the method of the present invention.

The above objects of the invention and other objects which might hereinafter appear will be best understood from the following description considered with reference to the accompanying drawings.

In the drawings:

Fig. 1 is a perspective view of rubber sheeting illustrating the successive treatments to which said rubber sheeting is subjected in accordance with the present invention;

Fig. 2 is a perspective view, on a larger scale, of a piece of laminated and quilted rubber sheeting produced in accordance with the present invention, parts of said sheeting being cut away for the purposes of illustration;

Fig. 3 is a sectional view on the line 3—3 of Fig. 2;

Fig. 4 is a side view, in elevation, of a preferred machine embodying the present invention;

Fig. 5 is a view in elevation and partly in section on line 5—5 of Fig. 4;

Fig. 6 is a sectional view on the lines 6—6 of Fig. 5;

Fig. 7 is a detail sectional view on the line 7—7 of Fig. 6;

Fig. 8 is a transverse view in elevation and partly in section on the line 8—8 of Fig. 4;

Fig. 9 is a transverse view in elevation, and partly in section of the line 9—9 of Fig. 4;

Fig. 10 is a view partly in elevation and partly in section on the line 10—10 of Fig. 8;

Fig. 11 is a detail sectional view on the line 11—11 of Fig. 4;

Fig. 12 is a detail sectional view on the line 12—12 of Fig. 10;

Referring now to the drawings in detail, the method of producing the laminated and quilted rubber sheeting comprises, as illustrated in Fig. 1, the steps of superposing two or more, here shown as two, sheet rubber layers 10 and 12, uniting said superposed layers along spaced transversely extending lines 14, and then uniting the side edges 16 of the laminated material preferably by a cut-seaming operation as will be hereinafter described, and then further uniting the material along longitudinally extending spaced lines 18 whereby to form in the laminated sheet a multiplicity of pockets 20 of rectangular or other suitable outline in which air is trapped during the process of forming said pockets. The rubber sheeting is unvulcanized or partially vulcanized so that said layers may be caused to adhere to each other. Either one or both of said rubber sheets may be wholly vulcanized or one or both may be partially cured but not beyond the extent which would completely destroy the adhesiveness of the rubber material. For convenience in reference, the rubber sheeting whether wholly unvulcanized or partially vulcanized will be referred to as vulcanizable sheet material.

Referring now to Fig. 6, for producing the quilted rubber material in accordance with the method as briefly described above, the layers 10 and 12 are passed between a pair of rollers 22 and 24 which operate at the same speed and which are provided with ribs 26 which extend in spaced relation longitudinally of said rollers. This operation unites the rubber sheets along the transversely extending spaced lines 14 and produces tubular portions or passages 28 which are open at their ends. For the purpose of causing formation of said tubular portions 28, one of the sheet rubber layers 10 is preferably fed under slight tension to the rollers 22 and 24, and preferably at a tension which is somewhat higher than the tension of the other rubber layer. After the transversely extending tubular portions 28 are formed, the laminated material is cut-seamed and thereby also trimmed at its longitudinally extending side edges thereby closing the ends of tubular portions 28 and forming the seamed side edges 16 hereinbefore referred to. This operation is performed by a pair of cut-seaming rotary disks 30, one at each side edge of the rubber sheeting, each of which cooperates with a companion roller 34. Thereafter the material is passed between a pair of rollers 36 and 38 which operate at the same speed and which are provided with circumferential ribs 40 and 42 respectively. Ribs 42 are preferably somewhat wider at their outer ends than ribs 40. Said ribs 40 of roller 36 and said ribs 42 on roller 38 are disposed in spaced relation longitudinally of each other on the respective rollers and engages the material passed therebetween for subdividing the tubular portions 28 along the longitudinally extending lines 18 whereby to produce the pockets 20. The quilted material may thus be produced in continuous lengths from webs of suitable vulcanizable sheet material and may be subsequently cut into any desired lengths. After the pockets 20 are formed the material is vulcanized.

The machine, including the above described quilting and cutting elements will now be described. Said machine comprises as here shown a suitable frame including longitudinally extending side rails 50. Rollers 22 and 24 are journalled for rotation in a pair of upright standards 52 supported on side rails 50. More specifically, the lower roller 24 is journalled at its ends in fixed bearings 54 formed at the lower parts of standards 52. However, as it is desirable to adjust the rollers in relation to each other, roller 22 is mounted in bearing blocks 56 which are slidable in a vertical direction longitudinally of the guide portions 58 of said standards. For adjusting roller 22 toward and away from roller 24, there is provided a rotary shaft 60 journalled at its ends in bracket extensions 62 which are fixed at the upper ends of standards 52. The ends of shaft 60 are provided with bevelled gears 64 fixed thereto and engaging bevelled gears 66. Said bevelled gears 66 are screw-threaded internally and are in engagement with screw-threaded rods 68. Each threaded rod 68 extends vertically between the guide rails 58 of standards 52, and is fixed at its lower end to the bearing block 56. Thus, by rotating hand wheel 70 fixed to shaft 60, rods 68 are caused to move up or down thereby to move roller 22 away from or toward roller 24 as may be desired. A spring 72 is interposed between each bearing block 56 and the confronting portion 74 of the companion standard 52. While these springs are not essential, they are preferred as they facilitate a more sensitive adjustment of roller 22 and take up lost motion. Rollers 22 and 24 are provided at their ends with continuous peripheral portions 76 and 78, respectively, which at their outer surfaces are in the same plane as the outer surfaces of the ribs formed on said rollers, respectively, whereby said peripheral portions of the companion rollers are in position to engage each other at both ends of said rollers thereby to prevent the application of excess pressure to the ribs of the rollers and thus to prevent chipping off or other injury to said ribs during the adjustment and rotation of said rollers.

The mounting for rollers 36 and 38 is the same or substantially the same as the mounting for the rollers 22 and 24 as just described. Thus, as seen in the drawings, the roller 38 is journalled at its ends in fixed bearings 80 formed in the lower portions of standards 82 which are of the same construction and arranged in the same way as standards 52. Also, as clearly shown in the drawings, roller 36 is adjustable towards and away from roller 38 by mechanism of the same construction as that described in reference to the adjustment of roller 22.

The mounting of the cut-seaming means comprises a pair of standards 84 mounted on the side rails 50 between standards 52 and 82. Cutting disks 30 are carried by a shaft 86 which is mounted for rotation in bearing blocks 88 movable longitudinally of standards 84. Said blocks are guided for such movement by the side guide rails 90 of standards 84. Cutting disks 30 cooperate with companion rollers 34 carried by shaft 92. Said last mentioned shaft is journalled for rotation in fixed bearings 94 at the lower ends of standards 84. Said rollers 34 comprise hardened steel sleeves 96 removably fixed on shaft 92, a key 98 being provided for securing each sleeve against rotation on said shaft. Cutting and seaming disks 30 are pressed against their companion sleeves 96 by springs 100 which are placed adjustably under compression by adjusting screws 102.

Provision is made for positively driving each of the rollers as well as the cutting and seaming disks 30 and their companion rollers 34. Roller 38 is driven in any suitable way, here shown as by a pulley 104 actuated by a belt 106 driven by a motor M. The shaft of roller 38 is provided with a gear 108 which meshes with a gear 110 fixed to the shaft of roller 36. The shaft of roller 38 is also provided at its opposite end with a gear 112 which meshes with an idler gear 114 which in turn engages gear 116 fixed to the end of shaft 92 of the cut-seaming mechanism. Said last mentioned shaft has fixed thereto a gear 118 which engages a gear 120 on shaft 86 for rotating the latter. Rotation of rollers 22 and 24 is effected by an idler gear 122 which meshes with gear 116 and with a gear 124 fixed at one end of the shaft of roller 24. The other end of roller 24 has a gear 126 which engages a gear 128 fixed to the end of the shaft of roller 22 for rotating the latter. It will be understood that in the operation of the pairs of rollers 22 and 24 and 36 and 38, respectively, the range of adjustment is such that the companion gears of said pairs of rollers are always in mesh, although rollers 22 and 36 may be moved away from their companion rollers 24 and 38 respectively, when necessary, as when the layers 10 and 12 are being inserted therebetween, at which times said companion gears may be disengaged.

As hereinbefore indicated, rubber sheeting 10 and 12 are fed in the form of continuous webs from supply rolls. Provision for mounting such supply rollers is illustrated in Fig. 4. As here shown, the roll Ra of rubber sheeting 10 is carried by a pair of brackets 130, one on each side rail 50, having rollers 132 on which the ends 134 of the supply roll are supported. The roll Rb of material for web 12 is supported at its ends in brackets 136 fixed to the machine frame. A support 135 for web 12 extends upwardly from brackets 130 to rollers 22 and 24. For obtaining the desired tension on web 12 any suitable means may be provided. For this purpose, by way of illustration only, there is shown a friction shoe 138, there being one at each end of the roller Rb on each end bracket 136. Said friction shoe may be adjustably clamped on the disks 139 secured at the outer ends of the roll shaft, adjustable screws 140 or any other suitable devices being provided for this purpose.

Thus it is seen that the method herein described and the machine utilized in performing said method in accordance with the present invention are well adapted to accomplish the several objects thereof. It will be understood, however, that the invention may be practiced otherwise than as here shown. Therefore, I do not wish to be limited precisely to the present disclosure either with respect to the method or with respect to the machine, except as may be required by the appended claims.

Having thus described my invention, what I claim and desire to secure by Letters Patent is:

1. In a machine of the class described for making laminated and pocketed sheeting from a plurality of layers of vulcanizable material, means for uniting two layers of said material along spaced lines defining a plurality of passages between said layers open at their ends, means for uniting said layers at the ends of said passages for closing the latter and for simultaneously trimming the longitudinal side edges of said united layers, and means for uniting said layers along spaced lines for subdividing said passages for forming a multiplicity of closed pockets between said layers, said second mentioned uniting means being located between said first and last mentioned uniting means whereby the opposite ends of said passages are closed and the side edges of said layers are trimmed before said passages are subdivided by said last mentioned uniting means.

2. In a machine of the class described for making laminated and pocketed sheeting from a plurality of layers of vulcanizable material, means comprising a pair of rollers constructed and arranged for uniting two layers of said material along spaced lines defining a plurality of passages between said layers open at their ends, means constructed and arranged for cut-seaming said layers at the ends of said passages for closing the latter at said ends and for simultaneously trimming the longitudinal side edges of said united layers, and means comprising a pair of rollers constructed and arranged for uniting said layers along spaced lines for subdividing said passages for forming a multiplicity of closed pockets between said layers, said cut-seaming means being operable on said layers after said passages are formed therein and before said last mentioned rollers are operable on said layers for subdividing said passages.

3. In a machine of the class described for making laminated and pocketed sheeting from a plurality of layers of vulcanizable material, a pair of rollers for uniting two layers of material along spaced lines defining a plurality of open-end passages between said layers, at least one of said rolls having a plurality of spaced ribs extending longitudinally of the roller axis and arranged to cooperate with the other roller of said pair for uniting said material along said spaced lines, a pair of cut-seaming rollers for cut-seaming said layers at the ends of said passages for closing the latter at said ends and for simultaneously trimming the longitudinal side edges of said united layers, and a pair of rollers for uniting said layers along spaced lines for subdividing said passages for forming a multiplicity of closed pockets between said layers, one of said last mentioned rollers having a plurality of spaced peripherally extending ribs arranged to cooperate with its companion roller for uniting said material along said last mentioned lines for forming said pockets, said cut-seaming means being operable on said layers after said passages are formed by said first mentioned rollers and before said passages are subdivided for forming said pockets.

4. In a machine of the class described for making laminated and pocketed sheeting from a plurality of layers of vulcanizable material, means for uniting two layers of said material along spaced lines defining a plurality of passages between said layers open at their ends, means for thereafter uniting said layers at the ends of said passages for closing the latter and for trimming the longitudinal side edges of said united layers, and means for uniting said layers along spaced lines for subdividing said passages for forming a multiplicity of closed pockets between said layers, said second mentioned uniting means being located between said first and last mentioned uniting means whereby the opposite ends of said passages are closed and the side edges of said layers are trimmed before said passages are subdivided by said last mentioned uniting means.

5. In a machine of the class described for making laminated and pocketed sheeting from a plurality of layers of vulcanizable material, means comprising a pair of rollers constructed and arranged for uniting two layers of said material along spaced lines defining a plurality of passages between said layers open at their ends, means constructed and arranged for thereafter cut-seaming said layers at the ends of said passages for closing the latter at said ends and for simultaneously trimming the longitudinal side edges of said united layers, and means comprising a pair of rollers constructed and arranged for uniting said layers along spaced lines for subdividing said passages for forming a multiplicity of closed pockets between said layers, said cut-seaming means being operable on said layers after said passages are formed therein and before said last mentioned rollers are operable on said layers for subdividing said passages.

6. In a machine of the class described for making laminated and pocketed sheeting from a plurality of layers of vulcanizable material, a pair of rollers for uniting two layers of material along spaced lines defining a plurality of open-end passages between said layers, at least one of said rolls having a plurality of spaced ribs extending longitudinally of the roller axis and arranged to cooperate with the other roller of said pair for uniting said material along said spaced lines, a pair of cut-seaming rollers for cut-seaming said layers at the ends of said passages for closing the latter at said ends and for trimming the opposite side edges of said united layers, and a pair of rollers for uniting said layers along spaced lines between the ends of said passages for subdividing said passages for forming a multiplicity of closed pockets between said layers, one of said last mentioned rollers having a plurality of spaced peripherally extending ribs arranged to cooperate with its companion roller for uniting said material along said last mentioned lines for forming said pockets, said cut-seaming rollers being disposed between said pairs of rollers and operable on said layers after said open-end passages are formed and before said layers are engaged by said last mentioned pair of rollers for subdividing said passages.

7. In a machine of the class described for making laminated and pocketed sheeting from a plurality of layers consisting of vulcanizable material, means for uniting two layers of said material along spaced lines defining a plurality of passages between said layers open at their ends, means for uniting and cutting said layers at the ends of said passages for closing the latter and for trimming the side edges of said united layers, and means for uniting said layers along spaced lines between said ends of said passages for subdividing said passages for forming a multiplicity of closed pockets between said layers, said second mentioned uniting means being located between said first and last mentioned uniting means whereby the opposite ends of said passages are closed and the side edges of said layers are trimmed before said passages are subdivided by said last mentioned uniting means, and means for tensioning at least one of said layers while it is uniting with said other layer along said first mentioned lines.

8. In a machine of the class described for making laminated and pocketed sheeting from a plurality of layers of vulcanizable material, means comprising a pair of rollers constructed and arranged for uniting two layers of said material along spaced lines defining a plurality of passages between said layers open at their ends, means constructed and arranged for cut-seaming said layers at the ends of said passages for closing the latter at said ends and for simultaneously trimming the longitudinal side edges of said united layers, and means comprising a pair of rollers constructed and arranged for uniting said layers along spaced lines between said ends of said passages for subdividing said passages for forming a multiplicity of closed pockets between said layers, said cut-seaming means being disposed between said pairs of rollers and operable on said layers after said open-end passages are formed and before said layers are engaged by said last mentioned pair of rollers for subdividing said passages.

9. In a machine of the class described for making laminated and pocketed sheeting from a plurality of layers consisting of vulcanizable material, means comprising a pair of rollers constructed and arranged for uniting two layers of said material along spaced lines defining a plurality of passages between said layers open at their ends, means constructed and arranged for cut-seaming said layers at the ends of said passages for closing the latter at said ends and for simultaneously trimming the longitudinal side edges of said united layers, and means comprising a pair of rollers constructed and arranged for uniting said layers along spaced lines for subdividing said passages for forming a multiplicity of closed pockets between said layers, said cut-seaming means being operable on said layers after said passages are formed therein and before said last mentioned rollers are operable on said layers for subdividing said passages, and means for tensioning at least one of said layers while it is uniting with said other layer along said first mentioned lines.

10. In a machine of the class described for making laminated and pocketed sheeting from a plurality of layers of vulcanizable material, a pair of rollers for uniting two layers of material along spaced lines defining a plurality of open-end passages between said layers, at least one of said rolls having a plurality of spaced ribs extending longitudinally of the roller axis and arranged to cooperate with the other roller of said pair for uniting said material along said spaced lines, a pair of cut-seaming rollers for cut-seaming said layers at the ends of said passages for closing the latter at said ends, and a pair of rollers for uniting said layers along spaced lines for subdividing said passages for forming a multiplicity of closed pockets between said layers, one of said last mentioned rollers having a plurality of spaced peripherally extending ribs arranged to cooperate with its companion roller for uniting said material along said last mentioned lines for forming said pockets, said cut-seaming means being operable on said layers after said passages are formed by said first mentioned rollers and before said passages are subdivided for forming said pockets, and means for tensioning at least one of said layers while it is uniting with said other layer along said first mentioned lines.

11. The method of making laminated sheeting of vulcanizable material provided with a multiplicity of pockets therein, said method comprising progressively moving and arranging portions of two flat layers of said vulcanizable material in superposed relation at least one of said layers being stretchable, progressively uniting said flat layers along a plurality of spaced lines while continuously moving said superposed layers thereby successively forming a plurality of passages between said layers, thereafter uniting said layers at the ends of said passages for closing the latter, thereafter uniting said layer along spaced lines between said ends of said passages for subdividing said passages and thereby forming a plurality of pockets containing air, and then vulcanizing said sheeting.

12. The method of making laminated sheeting of vulcanizable material provided with a multiplicity of pockets therein, said method comprising progressively moving and arranging portions of two flat layers of said vulcanizable material in superposed relation, progressively uniting said layers along a plurality of spaced lines in succession during said movement of said superposed layers thereby successively forming a plurality of passages, thereafter cut-seaming said layers at the ends of said passages for closing the latter and for simultaneously trimming the longitudinal side edges of said united layers, thereafter uniting said layers along spaced lines between said ends of said passages for subdividing said passages and thereby forming a plurality of pockets containing air, and then vulcanizing said sheeting.

13. The method of making laminated sheeting of vulcanizable material provided with a multiplicity of pockets therein, said method comprising progressively moving and arranging portions of two flat layers of said vulcanizable material in superposed relation, progressively uniting said layers, during said movement thereof, along a plurality of spaced lines extending transversely of said layers with one of said layers under more tension than the other in a direction longitudinally of said layers, thereafter cut-seaming said layers together along their longitudinal side edges for closing said passages and for simultaneously trimming the longitudinal side edges of said united layers, and thereafter uniting said layers along spaced lines between said ends of said passages for subdividing said passages for forming a multiplicity of closed pockets between said layers.

14. The method of making laminated sheeting of vulcanizable material provided with a multiplicity of pockets therein, said method comprising arranging two flat layers of said vulcanizable material in superposed relation, uniting said superposed layers, while they are both flat, along a plurality of spaced lines and forming a plurality of passages open at their opposite ends, continuously moving said layers during said uniting operation, thereafter and during the movement of said layers sealing the opposite ends of said passages for confining air therein, and thereafter and during the movement of said layers uniting said layers along spaced lines between the ends of said passages for subdividing said passages and thereby forming a plurality of pockets containing air.

15. The method of making laminated sheeting of vulcanizable material provided with a multiplicity of pockets therein, said method comprising arranging two flat layers of said vulcanizable material in superposed relation, continuously moving said superposed layers, uniting said superposed moving layers, while they are both flat, along a plurality of spaced lines extending transversely of said layers with one of said layers under more tension than the other in a direction longitudinally of said layers to form a plurality of successive passages extending transversely of said layers, thereafter uniting said layers along their longitudinal side edges for closing the opposite ends of said passages, thereafter uniting said layers along spaced lines between the ends of said passages for subdividing said passages for forming a multiplicity of closed pockets between said layers, and thereafter vulcanizing said sheeting.

ROLAND H. GUINZBURG.